United States Patent [19]

Weyrauch

[11] 3,927,898
[45] Dec. 23, 1975

[54] HAND TRUCK

[75] Inventor: George L. Weyrauch, Philadelphia, Pa.

[73] Assignee: Gulf & Western Manufacturing Company, New York, N.Y.

[22] Filed: Mar. 25, 1974

[21] Appl. No.: 454,109

[52] U.S. Cl. ............................. 280/47.27; D12/34
[51] Int. Cl.² ................................................ B62B 1/10
[58] Field of Search........... 280/47.27, 47.28, 47.29, 280/47.24, 47.3, 47.31, 47.17; D12/24, 32, 34

[56] References Cited
UNITED STATES PATENTS

| | | | |
|---|---|---|---|
| 1,033,141 | 7/1912 | Wood | 280/47.27 |
| 1,424,938 | 8/1922 | Peterson | 280/47.27 |
| 1,799,659 | 4/1971 | Watson et al. | 280/47.27 X |
| 1,908,618 | 5/1933 | Watson et al. | 280/47.27 |
| 2,028,023 | 1/1936 | Smith | 280/47.27 |
| 3,079,168 | 2/1963 | Monroe et al. | 280/47.27 UX |

FOREIGN PATENTS OR APPLICATIONS 580,222  8/1946  United Kingdom............... 280/47.3

Primary Examiner—M. H. Wood, Jr.
Assistant Examiner—John A. Pekar
Attorney, Agent, or Firm—Charles I. Sherman

[57] ABSTRACT

A two-wheel hand truck assembly comprising a body member, hand grip means, a toe plate and wheel-axle assembly. The hand truck can be sold disassembled and packaged in a protective carton of a shape and size that is convenient for shipping, handling and storing, and the user can re-assemble it without the use of special tools. The body member is manufactured from a single piece of pressed sheet metal. The wheel-axle assembly comprises sheet metal brackets mountable to the body member, a non-rotatable axle which is secured to the brackets by U-shaped bolts, and a pair of wheels adapted for quick assembly onto the axle.

11 Claims, 4 Drawing Figures

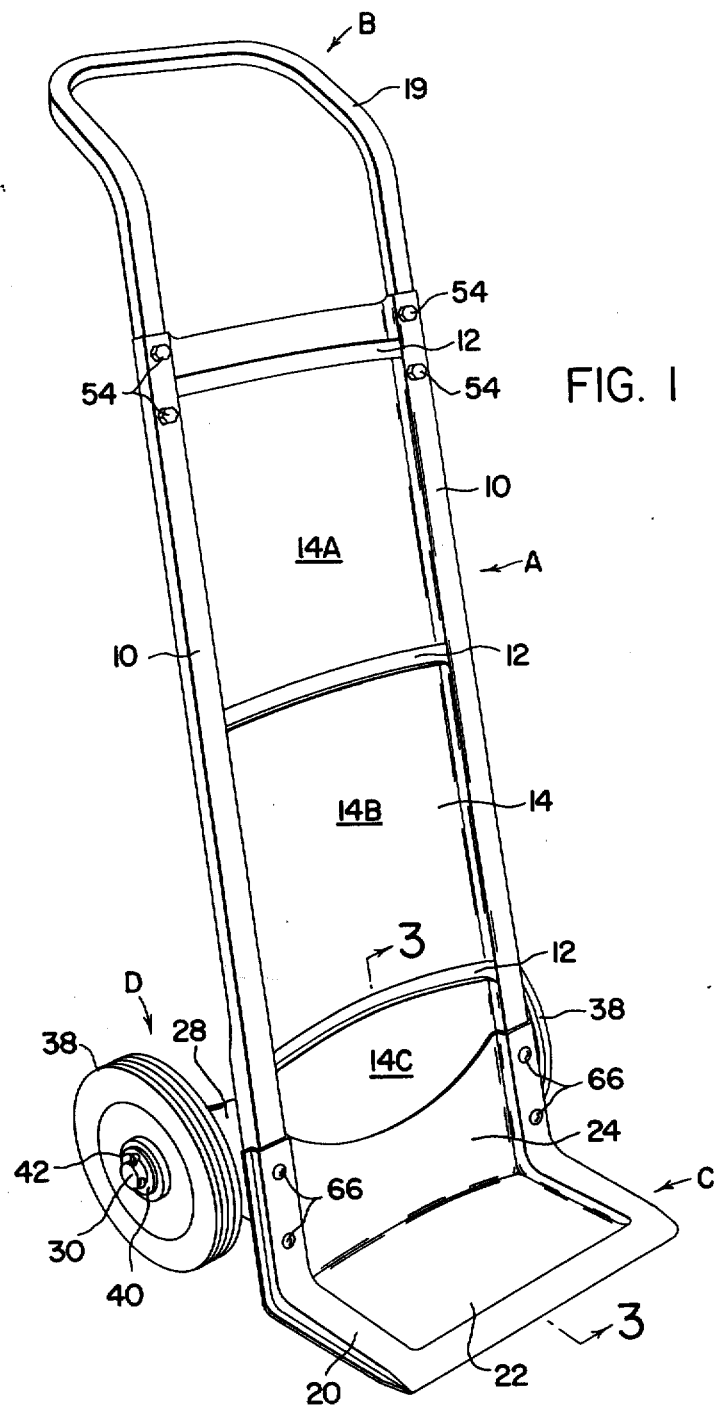

HAND TRUCK

SUMMARY OF THE INVENTION

This application pertains to the art of load handling devices and more particularly to two-wheel hand trucks.

Two-wheel hand trucks have heretofore been constructed generally of a multiplicity of various sized parts secured together by various means such as by welding, riveting and the like. Protective packaging is generally not effectively used with prior art factory assembled hand trucks since excessive space is required for storing and/or shipping.

The present invention contemplates an improved hand truck to overcome the above shortcomings of the prior art devices. Manufacturing costs are greatly reduced both in the fabrication of the components and by the elimination of assembly costs. The possibility for damage of the present hand truck during shipping and/or storage is greatly reduced, because the unassembled components can be more efficiently packaged in a protective space-conserving carton.

In accordance with the present invention there is provided an inexpensive hand truck which can be assembled by the user.

In accordance with a more limited aspect of the invention there is provided a two-wheel hand truck in which the components are constructed of light weight pressed sheet metal.

A further object of the invention is to provide a two-wheel hand truck which comprises a closed unitary body for better cargo support.

The invention further contemplates a two-wheel hand truck which can be fully assembled without resort to welding or riveting techniques.

Another still further object of the invention is to provide a hand truck which can be efficiently shipped and stored in cartons requiring a minimum of space.

The invention may take physical form in certain parts and arrangement of parts. A preferred embodiment will be described in detail in the specification and illustrated in the accompanying drawings which form a part hereof and wherein:

FIG. 1 is a perspective view of a preferred embodiment of the invention as assembled.

DESCRIPTION OF PREFERRED EMBODIMENT

Figure 2:
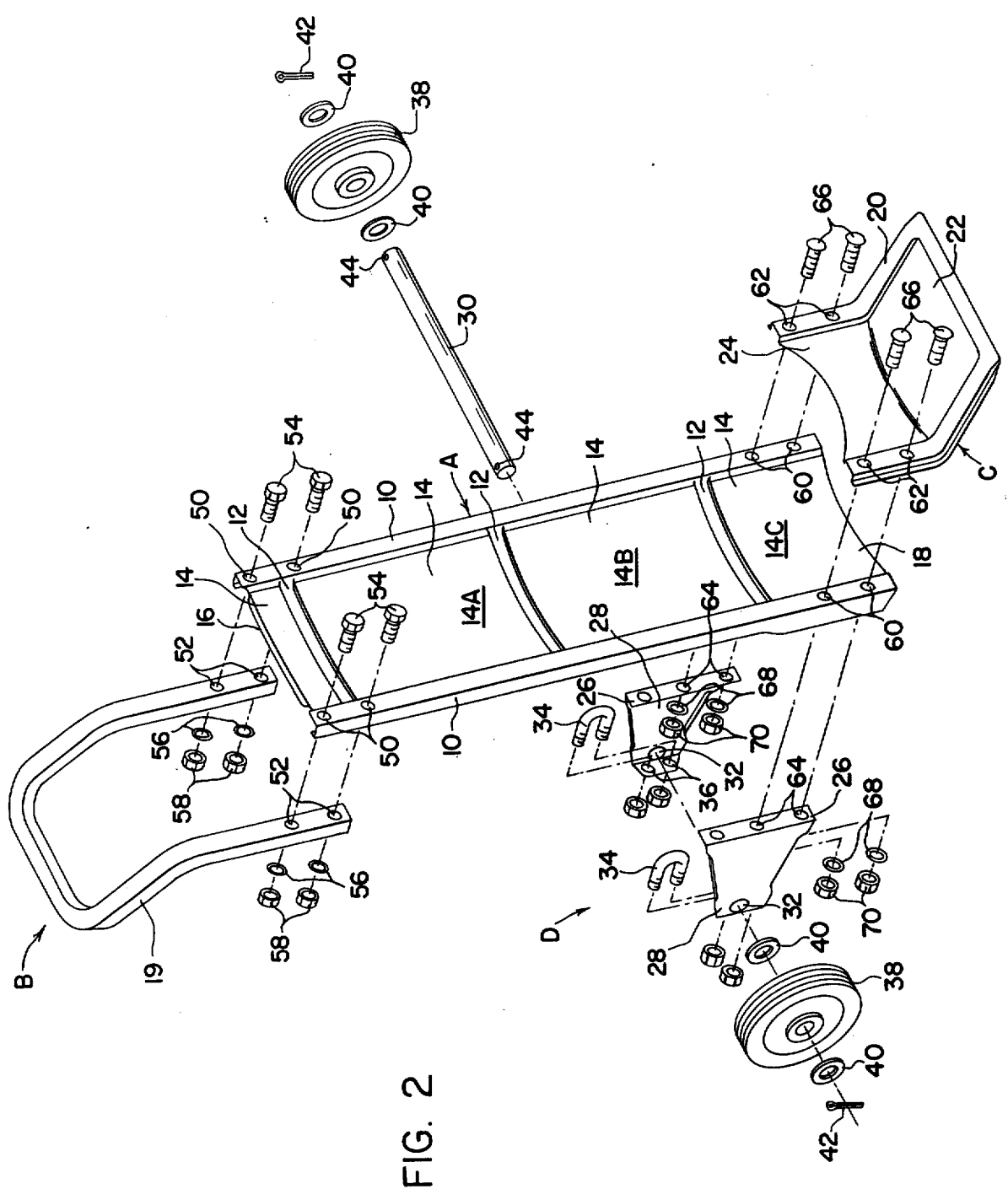
FIG. 2 is an exploded view of the preferred embodiment of the invention shown in FIG. 1.
Figure 3:
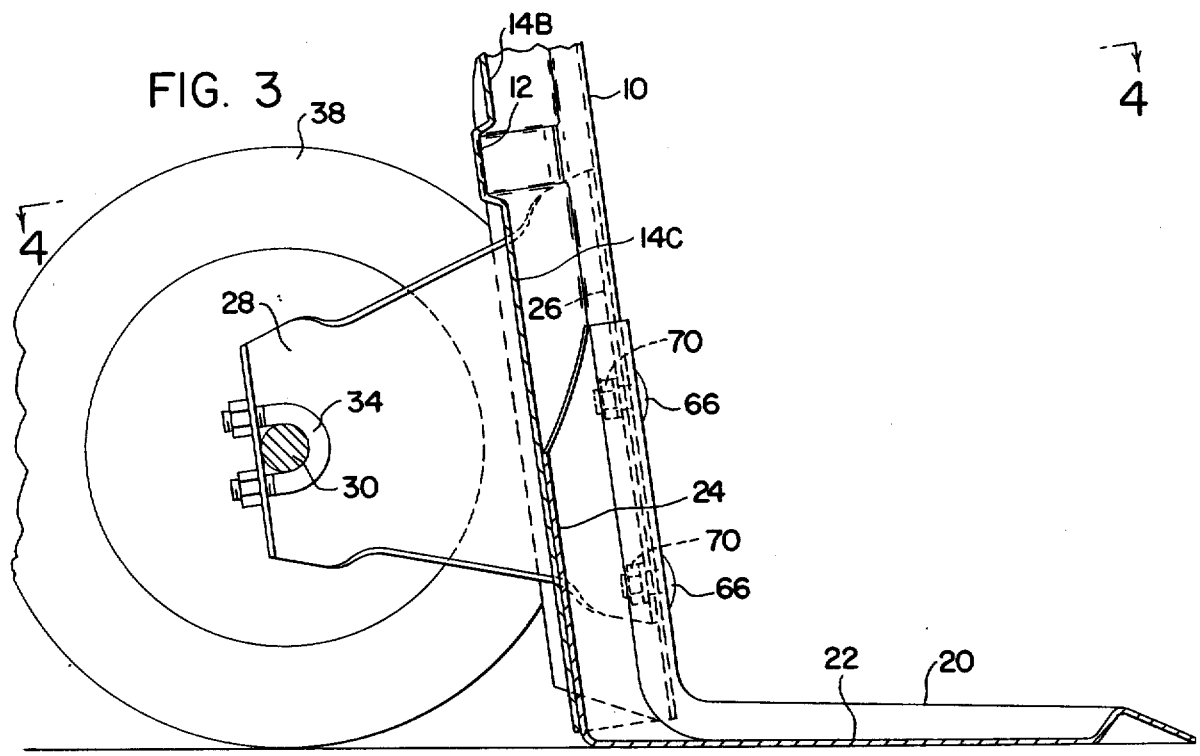
FIG. 3 is an elevational side view of this invention taken along line 3—3 of FIG. 1.
Figure 4:
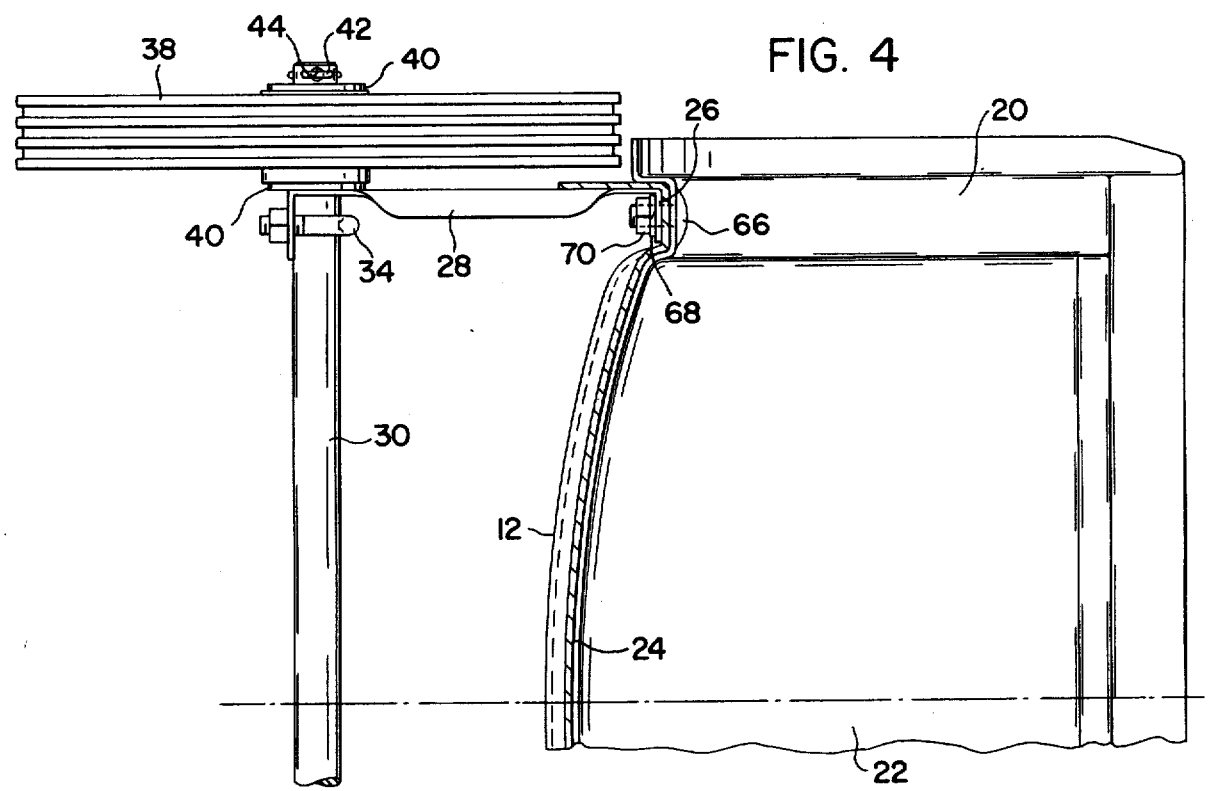
FIG. 4 is a top view of this invention taken along line 4—4 of FIG. 3.

Referring now to the drawings which are for the purposes of illustrating a preferred embodiment of the invention only, and not for purposes of limiting the same, the figures show a hand truck assembly which comprises a body member A, hand grip means B, tow plate C, and wheel-axle assembly group D.

In the preferred embodiment shown, body member A may be fabricated from a single piece of light-weight sheet metal, preferably steel or non-ferrous metal, pressed into the desired shape, although non-metallic plastic sheets are within the contemplation of the invention. The body comprises two longitudinally extending parallel side rail portions 10, channel shaped for strength and to receive and fasten other components thereto. Extending between side rails 10 are reinforcing cross rib portions 12. Body panel areas 14 are located in the spaces defined by side rail portions 10 and cross rib portions 12. Top edge 16 and bottom edge 18 of body member A are concavely arcuate.

In the preferred embodiment, body panel areas 14 and cross rib portions 12 are of a concavely curved contour between the side rail portions 10 to stabilize the load being carried thereon. Body member A is preferably from a single piece of sheet steel, pressed into shape to form portions 10, 12 and 14.

The hand grip means B is a U-shaped member 19 preferably constructed of rectangular tubular steel stock, the free ends of which are adapted to nest within the hollows of upper side rail portions 10. Thus the free ends of the hand grip B are received within and are embraced by the backsides of the channel configurations of the side rail portions 10 and fastened thereto.

Toe plate member C is L-shaped in section comprising perimeter channel portion 20, ground plate portion 22 and back plate portion 24. It will be appreciated that all three portions of toe plate member C can be formed, in the preferred embodiment, from a single piece of sheet metal. Toe plate C is fastened to body member A at the ends of perimeter channel 20 by nesting the upper free ends of channel 20 with the lower free ends of channel portions 10 and securing channel portions 10 and 20 together with threaded fasteners or the like.

Wheel-axle assembly D is attached to body member A at surfaces 26 of bracket members 28 which nest within the lower ends of rail portions 10. Bracket members 28 are also preferably constructed from pieces of pressed light-weight sheet metal. Axle member 30 is journaled within openings 32 on bracket members 28. U-shaped bolts 34 are attached to bracket members 28 around axle 30 and through openings 36 to non-rotatably fix the axle in position on brackets 28. In the preferred embodiment, washers 40 are placed on the axle on either side of wheels 38, and then cotter pins 42 are attached to the axle 30 through openings 44 to secure the wheels rotatably in place.

Openings 50 are provided at the tops of side rail portions 10 and are concentric with openings 52 on hand grip means to provide means for attaching hand grip means B to body member A. Attachment is accomplished by using bolts 54, lock washers 56, and fastening nuts 58.

Openings 60 are provided at the bottoms of side rail portions 10 and adapted to align with openings 62 on toe plate member C as well as openings 64 on bracket members 28 of wheel-axle assembly D. This enables the user to attach the body member, the toe plate member and the wheel-axle assembly with the same fastening means. Bolts 66, lock washers 68, and fastening nuts 70 comprise the means by which the toe plate member and the wheel-axle assembly are attached to body member A. Thus, assembly of the hand truck is very simple, performable by the owner or user of the hand truck, requiring no special tools.

The invention has been described with reference to a preferred embodiment. Obvious modifications and alterations will occur to others upon the reading and understanding of the specification. It is my intention to include all such modifications and alterations insofar as they come within the scope of the appended claims or the equivalent thereof.

Having thus described my invention, I now claim:

1. In a hand truck having hand grip means, toe plate means, body means therebetween, and wheel means secured thereto, the improvement comprising: a closed unitary body member having channel shaped side rail portions formed integrally therein and a plurality of reinforcing rib portions formed integrally therein transverse to said rail portions to define imperforate panel areas therebetween; U-shaped hand grip means having free lower ends adapted to nest within the upper portions of said body member side rail portions; fastener means to secure said hand grip means to said side rail portions; a one piece toe plate member having side portions formed therein to nest with the lower ends of said body member side rail portions; fastener means to secure said toe plate member to said body member; axle bracket members adapted to nest with the lower ends of said body member side rail portions and adapted to be secured to said side rail portions by said toe plate fastener means; an axle non-rotatably secured to said axle bracket members and extending outboard therefrom to receive wheels thereon; and fastening means to secure said wheels on the outboard ends of said axle.

2. The hand truck set forth in claim 1, wherein said body member, and said toe plate member are each formed from ferrous sheet metal.

3. The hand truck set forth in claim 1, wherein said body member and said toe plate member are each formed from non-ferrous sheet metal.

4. The hand truck set forth in claim 1, wherein said body member and said toe plate member are each formed from non-metallic sheet material.

5. The hand truck set forth in claim 1, wherein said toe plate has a reinforcing rib formed across the front edge thereof.

6. The hand truck set forth in Claim 1, wherein said hand grip means comprises a one piece U-shaped member formed from hollow rectangular sheet metal stock.

7. The hand truck set forth in claim 1, wherein said hand grip means comprises a one piece U-shaped member formed from channel shaped sheet metal stock.

8. The hand truck set forth in claim 1, wherein said hand grip means and said toe plate member are secured to said body member with threaded fasteners.

9. The hand truck set forth in claim 1, wherein said axle bracket members and said toe plate members are secured to said body member by threaded fasteners common to all three members.

10. The hand truck set forth in claim 1, wherein said axle is non-rotatably secured to said bracket members by threaded U-bolt fasteners.

11. In a hand truck having hand grip means, toe plate means, body means therebetween, and a wheel assembly secured thereto, the improvement comprising: a closed, unitary body member having channel shaped side rail portions formed integrally therein, a plurality of reinforcing rib portions formed integrally therein transverse to said rail portions to define imperforate panel areas therebetween, said hand grip means, toe plate means and wheel assembly being nested respectively with adjacent portions of said channel shaped side rails, and fastening means readily and manually assemblable and disassemblable for securing said hand grip means, toe plate means and wheel assembly respectively to said closed, unitary body member, whereby said hand truck can be readily and quickly assembled and disassembled for shipping, handling and storage.

* * * * *